(12) United States Patent
Khaykin et al.

(10) Patent No.: US 7,600,913 B2
(45) Date of Patent: Oct. 13, 2009

(54) SATURATED TRANSISTOR BASED TEMPERATURE SENSOR

(75) Inventors: Boris Khaykin, West Bloomfield, MI (US); Dave Rutkowski, Grosse Ile, MI (US)

(73) Assignee: tedrive Holding B.V., Heerlen (NL)

( * ) Notice: Subject to any disclaimer, the term of this patent is extended or adjusted under 35 U.S.C. 154(b) by 0 days.

(21) Appl. No.: 10/413,659

(22) Filed: Apr. 15, 2003

(65) Prior Publication Data

US 2004/0208226 A1 Oct. 21, 2004

(51) Int. Cl.
*G01K 13/00* (2006.01)
*G01K 7/00* (2006.01)

(52) U.S. Cl. .................. 374/178; 374/141; 327/512
(58) Field of Classification Search .......... 374/178, 374/141, 163; 257/470; 118/446; 327/512; 180/446, 443; 701/41
See application file for complete search history.

(56) References Cited

U.S. PATENT DOCUMENTS

| | | | | |
|---|---|---|---|---|
| 2,871,376 A | * | 1/1959 | Kretzmer | 327/512 |
| 3,330,158 A | | 7/1967 | Simonyan et al. | |
| 3,392,342 A | | 7/1968 | Ordower | |
| 3,668,428 A | | 6/1972 | Koerner | 307/229 |
| 3,809,929 A | | 5/1974 | Vittoz | 307/310 |
| 3,882,728 A | | 5/1975 | Wittlinger | 73/362 |
| 3,943,434 A | | 3/1976 | Haeusler et al. | 323/69 |
| 4,047,435 A | * | 9/1977 | Keith | 374/178 |
| 4,137,770 A | | 2/1979 | Trout | 73/362 |
| 4,401,898 A | | 8/1983 | Sommerer | 307/310 |
| 4,509,611 A | * | 4/1985 | Kade et al. | 180/446 |
| 4,652,144 A | | 3/1987 | Gunther et al. | 374/178 |
| 4,667,121 A | * | 5/1987 | Fay et al. | 327/83 |
| 4,715,462 A | | 12/1987 | Taig | 180/791 |
| 4,753,308 A | | 6/1988 | Noto et al. | 180/791 |
| 4,753,309 A | | 6/1988 | Marumoto et al. | 180/791 |

(Continued)

FOREIGN PATENT DOCUMENTS

GB 2034480 A * 6/1980

(Continued)

OTHER PUBLICATIONS

Dan Holt, "*Power Steering Get Electric Boost*", Service Tech Magazine, Jan. 2002, pp. 10 and 11.

(Continued)

*Primary Examiner*—Gail Verbitsky
*Assistant Examiner*—Mirellys Jagan
(74) *Attorney, Agent, or Firm*—Brinks Hofer Gilson & Lione

(57) ABSTRACT

A system for measuring a temperature of an electrical device is provided. The system comprises a transistor and a microprocessor. The transistor is part of an electrical device and is operable to perform a first function for the electrical device. For example, the transistor is operable in a saturated state to control activation of a pre-charge circuit in an electronic power assisted steering system. The microprocessor is responsive to a voltage at the transistor. The voltage of the transistor varies as a function of temperature (i.e., heat emitted from the electrical device). The microprocessor is operative to determine a temperature of the electrical device as a function of the voltage, where the sensing of temperature of the electrical device is different than the first function.

14 Claims, 4 Drawing Sheets

U.S. PATENT DOCUMENTS

| | | | |
|---|---|---|---|
| 4,771,843 A * | 9/1988 | Shimizu | 180/446 |
| 4,895,216 A * | 1/1990 | Fusimi et al. | 180/446 |
| 4,961,033 A * | 10/1990 | Hirota | 318/560 |
| 4,970,497 A * | 11/1990 | Broadwater et al. | 340/598 |
| 4,992,944 A | 2/1991 | Noto et al. | 364/424.05 |
| 5,324,069 A | 6/1994 | Ogawa | 280/707 |
| 5,668,721 A * | 9/1997 | Chandy | 180/412 |
| 5,758,741 A | 6/1998 | Tomioka | 180/446 |
| 5,810,111 A * | 9/1998 | Takeuchi et al. | 180/443 |
| 5,961,215 A * | 10/1999 | Lee et al. | 374/178 |
| 5,967,253 A | 10/1999 | Collier-Hallman | 180/421 |
| 5,980,106 A | 11/1999 | Yamamoto et al. | 374/178 |
| 6,046,560 A * | 4/2000 | Lu et al. | 318/432 |
| 6,092,618 A | 7/2000 | Collier-Hallman | 180/422 |
| 6,260,655 B1 * | 7/2001 | Mukai et al. | 180/446 |
| 6,326,753 B1 * | 12/2001 | Someya et al. | 318/471 |
| 6,470,995 B2 * | 10/2002 | Mukai et al. | 180/446 |
| 6,520,279 B2 * | 2/2003 | Fukumoto et al. | 180/446 |
| 6,612,738 B2 * | 9/2003 | Beer et al. | 374/183 |
| 6,812,722 B2 * | 11/2004 | Throngnumchai et al. | 324/760 |
| 2002/0014877 A1 * | 2/2002 | Kaji et al. | 318/783 |

FOREIGN PATENT DOCUMENTS

| | | | |
|---|---|---|---|
| JP | 55163423 A | * | 12/1980 |
| JP | 01241157 A | * | 9/1989 |
| JP | 03098488 A | | 4/1991 |
| JP | 08002430 A | * | 1/1996 |
| JP | 08127351 A | | 5/1996 |
| JP | 2000072006 A | | 3/2000 |

OTHER PUBLICATIONS

"2. PM Structural Components", http://www.epma.com/new_web_page/foresight/structural.htm, printed on Feb. 27, 2003, pp. 1-10.

*Visteon Corporation*, "*Visteon Corporation Wires Vehicles for Safety, Convenience and Performance*", http://www.visteon.com/newsroom/press/2000/00story100.shtml, printed on Feb. 27, 2003, pp. 1-3.

*NSXPrime, "Are There Other Electric Power Steering Setups"*, http://www.nsxprime.com/FAQ/Technical/eps.htm, printed on Mar. 4, 2003, pp. 1-3.

*AOpen, "Insides the Technology"*, http://www.aopen.com/tech.techinside/powerbridge.htm, printed on Apr. 14, 2003, p. 1.

* cited by examiner

SATURATED TRANSISTOR BASED TEMPERATURE SENSOR

FIELD OF INVENTION

This invention relates generally to the field of temperature sensors. More particularly, this invention relates to utilizing a transistor as a temperature sensor in an electrical device.

BACKGROUND

Temperature sensor circuits measure the temperature of electrical devices. Some electrical devices include a dedicated temperature sensor circuit that measures the temperature of the electrical device. The temperature sensor circuit provides crucial information regarding the operation of an electrical device to avoid overheating.

Typically, temperature sensor circuits include a voltage supply (Vcc) connected to a resistor (R) or constant current source (CCS) as shown in FIG. 1. The resistor is connected to a transistor (Q). The transistor is in a vicinity or close proximity to a device 102, where the device receives heat from the transistor. Typically, the device is a fan, transistor, control module etc. A base and collector of the transistor Q and the resistor or CCS are connected to a signal conditioner 101. Typically signal conditioner 101 comprises components such as amplifiers, resistors, and microprocessors. When Vcc is activated, a collector current (Ic) at transistor Q, a collector to emitter voltage (Vce) at transistor Q and a base to emitter voltage (Vbe) at transistor Q are produced. If the transistor is saturated, then Vbe temperature coefficient is more stable as the collector current varies. This functionality is graphically illustrated in FIG. 2, where the Vbe temperature coefficient of transistor Q as a function of collector current Ic is shown.

This nonlinear relationship of Ic and the Vbe temperature coefficient makes it burdensome to accurately assess the temperature at the device being monitored. In addition, this temperature sensor circuit is a separate circuit that requires many components and extra space on a circuit board.

Accordingly, there is a need for an apparatus and a method to measure a temperature of the electrical device that provides a simple and accurate assessment of the temperature of the device at minimal cost and complexity.

BRIEF SUMMARY

One embodiment of the invention provides a system for measuring a temperature of an electrical device. The system comprises a transistor and a microprocessor. The transistor is in an electrical device, where the transistor is operable to perform a first function in the electrical device. The microprocessor is responsive to a voltage at the transistor. The voltage at the transistor is responsive to the heat emitted from the electrical device. The microprocessor is operative to determine a temperature of the electrical device as a function of the voltage. Using the transistor to sense temperature is different than the first function of the transistor. The transistor is both used within the electrical device for a purpose other than sensing temperature and as a temperature sensor.

Another embodiment provides a system for measuring a temperature of an electrical device. The system comprises a transistor and a microprocessor. The transistor is operative in a saturated state. The microprocessor is operable to determine a temperature response to a voltage of the transistor where the transistor is in the saturated state.

Yet another embodiment provides a method for measuring a temperature of an electrical device. A first function with a transistor for an electrical device is performed. A temperature of the electrical device as a function of voltage is determined. Sensing the temperature of the electrical device is different than the first function.

These and other advantages will become more fully apparent as the following description is read in conjunction with the accompanying drawings.

DETAILED DESCRIPTION OF THE PRESENT INVENTION

In accordance with the invention, a transistor has a dual function of: 1. operating normally in one of many possible circuits or electrical systems, such as an electrical power assisted steering (EPAS) system, and 2. the transistor operates as a temperature sensor that measures a temperature of the electrical system, such as the EPAS system. In particular, this transistor has a first function, such as driving a Metal-Oxide Semiconductor Field Effect Transistor (MOSFET) in a circuit of the EPAS system to supply current to large capacitors of a device that transmits power to a motor of the EPAS system. This transistor can have any first function associated with an electrical device.

Since this transistor is operating in a normal manner by driving the MOSFET, this transistor is saturated. Saturation in a transistor occurs when a base current (Ib) of the transistor is so high that the collector-emitter voltage (Vce) has dropped below the base-emitter voltage (Vbe). In addition, a transistor or an electrical component is saturated when the transistor receives voltage and/or current to perform a normal operation in an electrical circuit. As stated above, this saturated transistor has a second function of being a temperature sensor that responds to a temperature of many possible electrical systems, such as the EPAS system.

Figure 3:
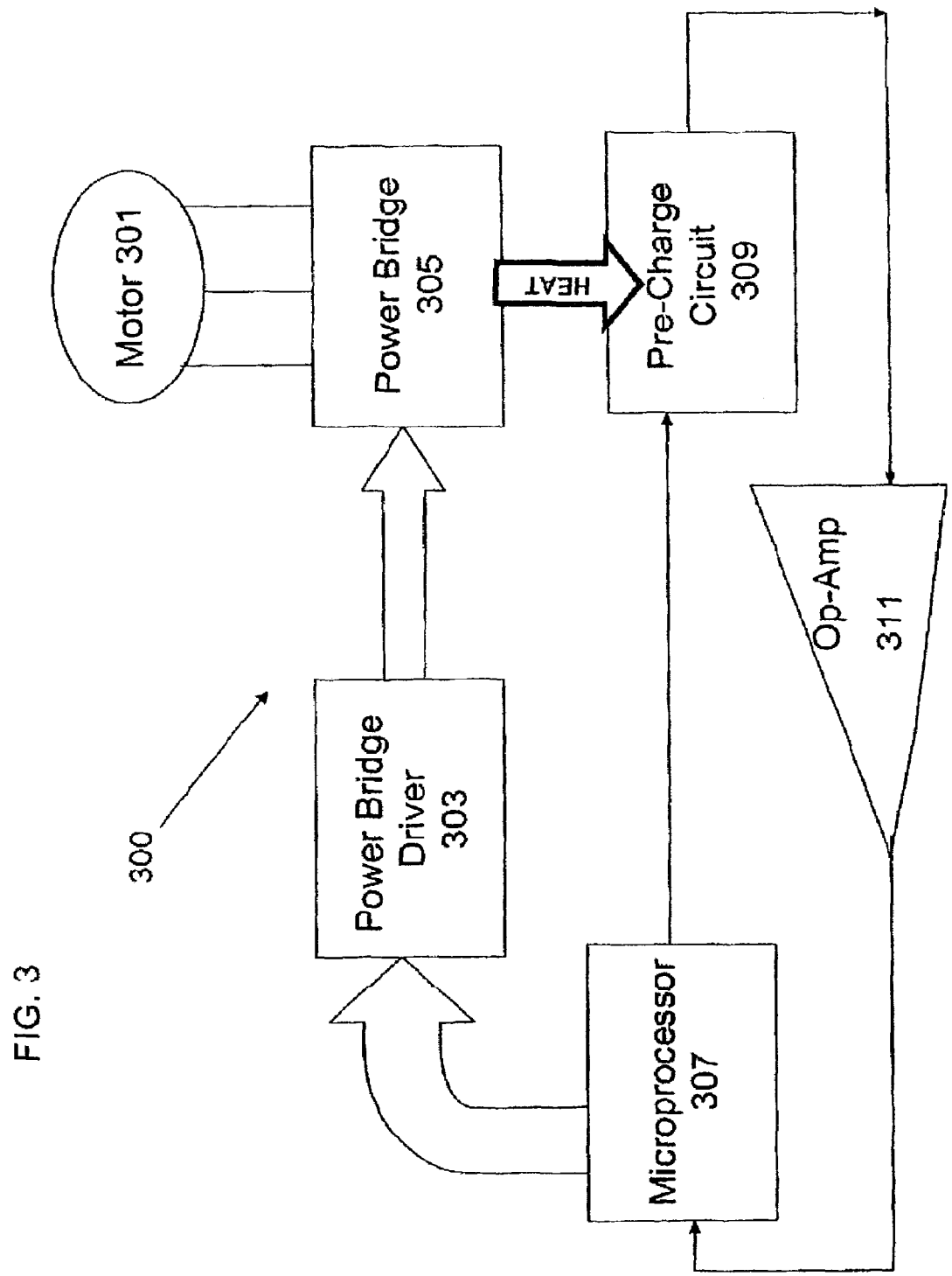
FIG. 3 schematically illustrates a block diagram of an electrical power assist steering system of one embodiment.

Referring to FIG. 3, an electric power assist steering system 300 includes: a motor 301, a power bridge driver 303, a power bridge 305, a microprocessor 307, a pre-charge circuit 309, and an operational amplifier system 311. Motor 301 is electrically connected to the power bridge 305.

The power bridge driver 303 is an integrated chip that includes control logic, a charge pump, a gate drive and a MOSFET, but other drivers may be used with different, additional or fewer components. In one embodiment, this power bridge 305 includes large capacitors that provide operating voltages and/or currents to motor 301. Motor 301 is an electrical motor in an Electrical Power Assistance Steering (EPAS) System. The motor is connected to a steering system.

The power bridge 305 is responsive to the power bridge driver 303, and the power bridge 305 is in a vicinity of the pre-charge circuit 309. Pre-charge circuit 309 is about 1-20 millimeters from the power bridge 305 but other distances may be used. By such positioning, a transistor of the pre-charge circuit 309 is more likely to be sensitive to temperatures of the power bridge 305.

The power bridge driver 303 is connected to the microprocessor 307. Microprocessor 307 is connected to the operational amplifier system 311, which is also connected to the pre-charge circuit 309. All of the aforementioned components are placed in a vicinity of a steering wheel column (not shown) that is connected to the steering motor 301. A cable, wire connection or any type of connection used to connect electrical devices interconnects the motor 301, the power bridge 305, power bridge driver 303, pre-charge circuit 309, microprocessor 307 and the operational amplifier system 311 as shown. Other interconnections with different additional or fewer components may be used.

The microprocessor 307 controls the operation of the EPAS system 300. In particular, this microprocessor 307 outputs a control signal to the pre-charge circuit 309. A transistor Q1 of FIG. 4 in the pre-charge circuit 309 (400 in FIG. 4) receives the control signal, which saturates transistor Q1, and this transistor Q1 becomes activated. When the saturated transistor Q1 is activated, then the transistor Q1 has a first function of driving the MOSFET Q2. The MOSFET Q2, sends current to large capacitors in an electrical device, such as power bridge 305. The large capacitors in power bridge 305 store the received current as a voltage across capacitors until the current is released and/or activated and transmitted to the motor 301.

This transistor Q1 has another function. The transistor Q1 serves as a temperature sensor that responds to temperature in a vicinity of the transistor Q1. In the positional arrangement discussed above, the temperature of the power bridge 305 affects the temperature of the transistor Q1, so the temperature of the power bridge is sensed in order to prevent overheating or malfunctioning.

The operational amplifier system 311 operates in conjunction with the saturated transistor Q1 to input voltage indicative of ambient temperature to the microprocessor 307. Depending on the input voltage received at the microprocessor 307, the microprocessor provides voltage and/or current to power bridge 303. Power bridge 303 receives the voltage and/or current then releases and/or activates the current or energy stored in large capacitors of the power bridge 305. This stored energy supplies power to the motor 301 to drive the EPAS system.

Figure 6:
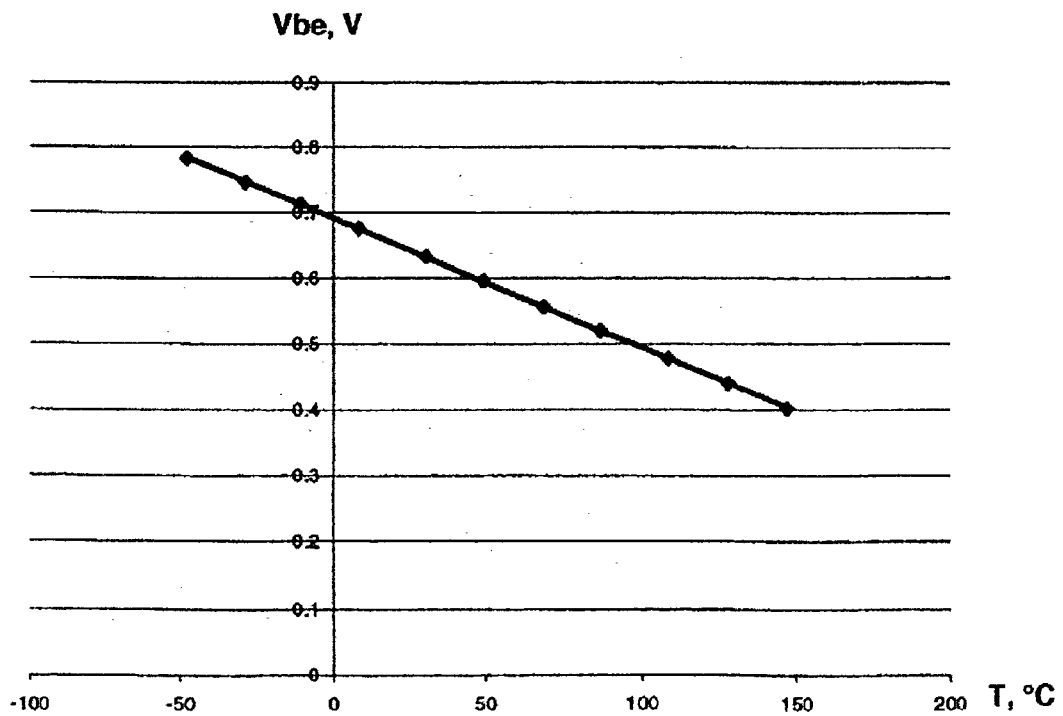
FIG. 6 depicts a graphical illustration of proportionality of Vbe versus an ambient temperature of an electrical device according to one embodiment.

This microprocessor 307 may have many forms, such as a hardware device integrated with a software algorithm. This software algorithm can include a graphical look-up table of FIG. 6, threshold values, conversion programs to convert voltage to a temperature and control instructions based on the measured temperature. Preferably, this hardware device includes one or more microprocessors, micro-controllers, or digital signal processors, having an electronic erasable program memory (EEPROM), read only memory (ROM) or Flash memory, static random access memory (RAM), a clocking/timing circuit, or any processor utilized in an electrical device. The software algorithm in microprocessor 307 enables it to convert a voltage into a temperature or temperature responsive control instruction based on the graphical look-up table of FIG. 6 or a conversion program. In addition, this software algorithm enables microprocessor 307 to perform instructions, such as reduce or cut-off power outputted or set a trouble code based on the temperature of the power bridge 305 or any electrical device. In alternative embodiments, the microprocessor 307 is one or more analog or digital devices configured to control the electrical device or other device, at least in part, responsive to the temperature or sensed voltage representing temperature.

Figure 4:
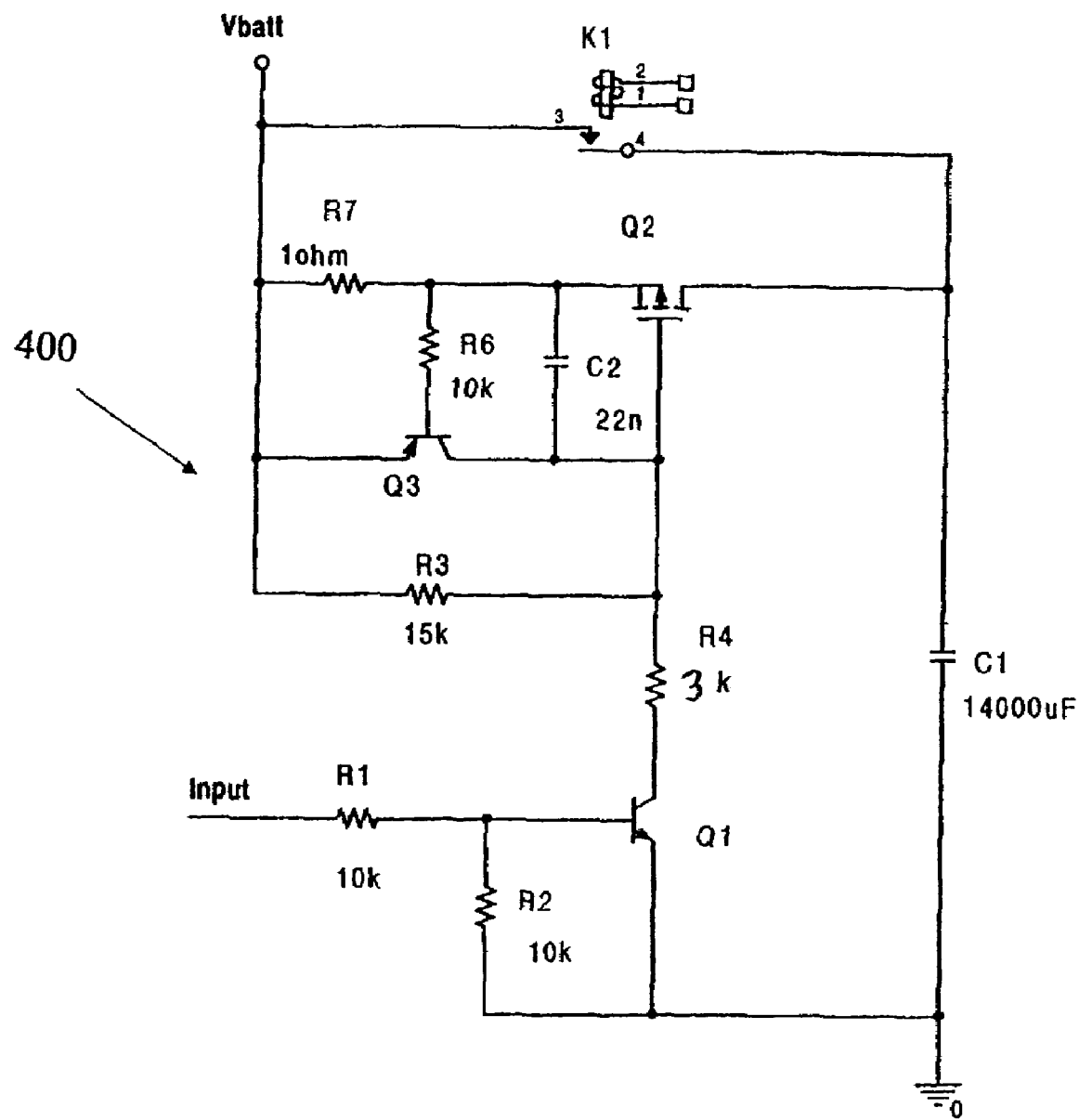
FIG. 4 schematically illustrates an Electric Power Assistance Steering bus capacitors pre-charge circuit topology according to an embodiment.

Microprocessor 307 outputs a control signal to the pre-charge circuit 309. The control signal received by the pre-charge circuit 309 may be a 5-volt signal or any other control signal outputted from a microprocessor. In this example, this bus capacitors pre-charge circuit 309 is a part of a larger Electrical Power Assistance Steering (EPAS) bus capacitors pre-charge circuit topology as shown in FIG. 4. This EPAS bus capacitors pre-charge circuit 400 includes a transistor Q1 that becomes activated when the pre-charge circuit 309 receives the control signal from the microprocessor. Even though Q1 is shown as an NPN transistor, other topologies with any of various bipolar transistors may be used, such as a NPN or PNP transistor. Transistor Q1 drives MOSFET Q2 to supply voltage and/or current to large capacitors in power bridge 305. Pre-charge circuit 309 is in a 1-20 millimeter vicinity of the power bridge 305. Since the pre-charge circuit 309 is in a vicinity or close proximity to the power bridge 305, transistor Q1 is also utilized to sense heat emitted from the power bridge 305. Large capacitors in the power bridge 305 utilize the voltage and/or current received from MOSFET Q2 to supply power to the motor 301 in the EPAS system. Thus, the transistor Q1 is saturated by the control signal from the microprocessor 307 and utilizes the control signal to drive the MOSFET Q2, which transmits voltage and/or current to the power bridge 305. The MOSFET Q2, transistor Q1, a bipolar junction transistor Q3, resistors R1-R4, resistor R6, resistor R7 and capacitors C1 and C2 are included in the EPAS bus capacitor pre-charge circuit 400. These resistors and capacitors have the following values R1 is 10 kohm, R2 is 10 kohms, R3 is 15 kohms, R4 is 1.1 kohms, R6 is 10 kohms, R7 is 1 ohm, C22 is 22 nanofarads and C1 is 14,000 microfarads in one embodiment, but other values may be used. The circuit 309 includes some of the components of the EPAS bus capacitor pre-charge circuit, such as transistor Q1 and resistors R1-R4 denoted in FIG. 5. A pre-charge circuit 309 with additional, different or fewer components may be provided.

Figure 5:
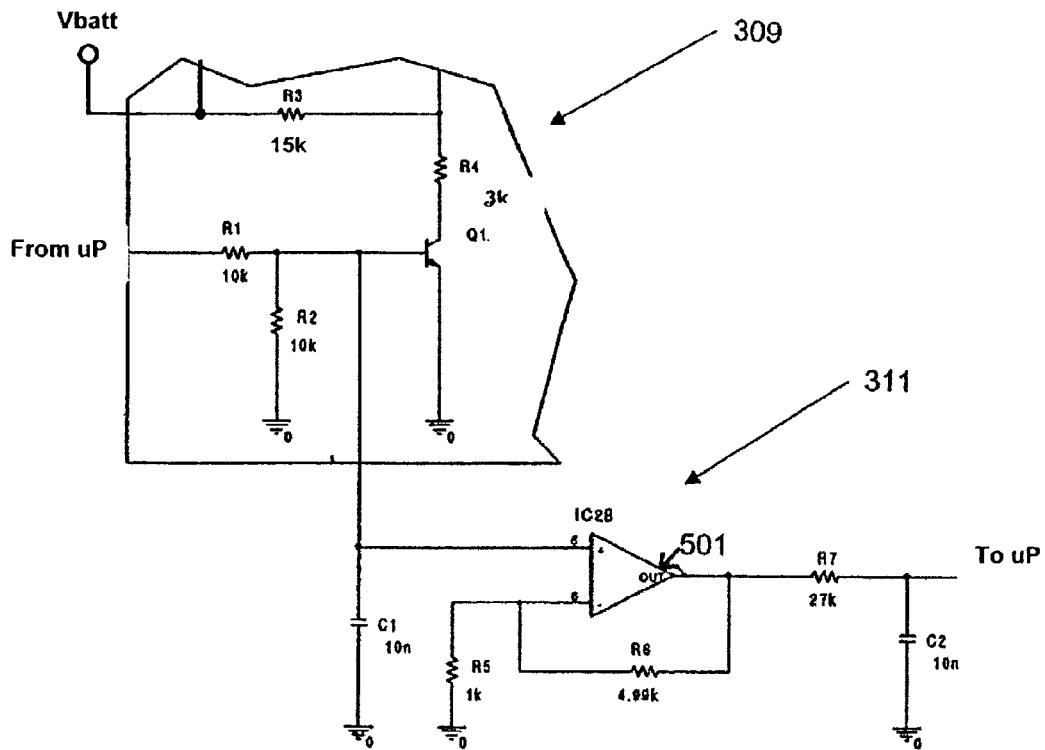
FIG. 5 schematically illustrates the pre-charge circuit and the operational amplifier system of FIG. 3.

FIG. 5 only shows that part of the precharge that is used for temperature measurement. The pre-charge circuit 309 receives the control signal from the microprocessor 307. When this control signal is transmitted to the pre-charge circuit 309, a base current (Ib) at transistor Q1 and a base to emitter voltage (Vbe) at transistor Q1 are produced. to the saturation state.

Figure 1:
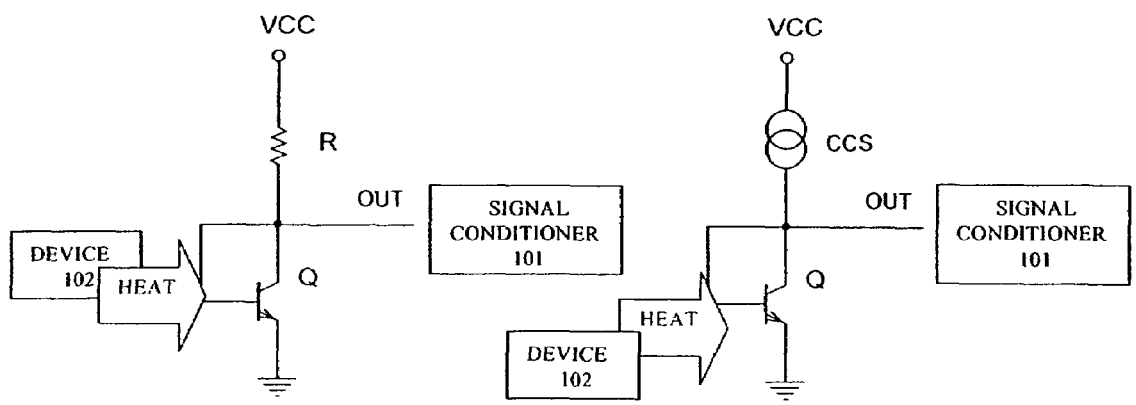
FIG. 1 schematically illustrates a prior art depiction of a temperature sensor circuit.
Figure 2:
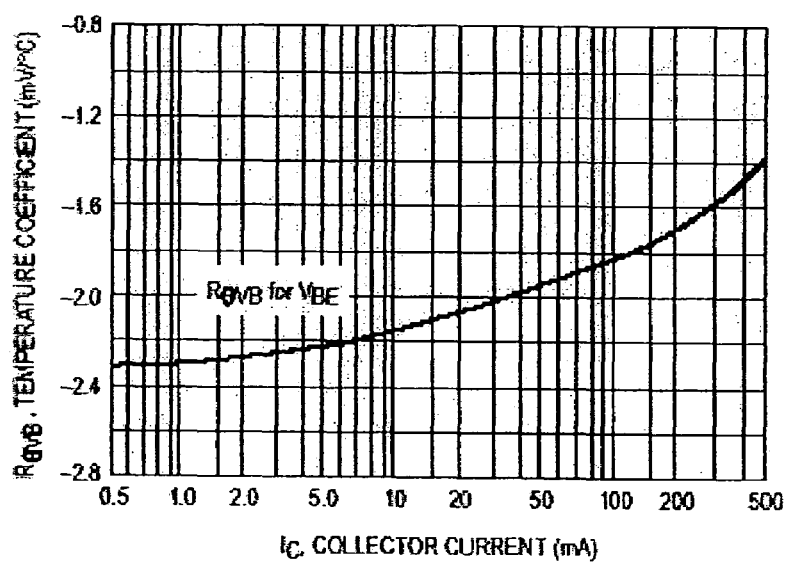
FIG. 2 depicts a graphical illustration of a Base-Emitter voltage Temperature Coefficient versus a collector current of a transistor in FIG. 1.

Referring To FIG. 2, the temperature coefficient curve is relatively flat between 0.5 and 1.0 milliamperes so it doesn't vary much with collector current. It is desirable to bias the transistor Q1 in the middle of that range so variations in battery voltage will not affect the temperature measurement. The nominal battery voltage in an automobile ranges between 9 and 18 volts when the nominal value is 13.5 volts. Resistors R3 and R4 are chosen to supply 0.75 milliamperes at 13.5 volts; R3+R4=13.5/0.75=18,000 ohms. When the battery voltage is 9 volts the current will be 0.5 milliamperes and when the battery voltage is 18 volts the current will be 1.0 milliampere. For this application R3 will be set to 15,000 ohms and R4 will be set to 3,000 ohms. Since it is required to bias Q1 in the saturated state, the base current must be greater than 10% of the maximum collector current of 1.0 milliampere or 0.1 milliampere. Assuming that the signal to R1 comes from a microprocessor operating at 5 volts, setting R1 and R2 to 10,000 ohms injects about 0.4 milliamperes into the base, which is greater than the minimum required. Other R1, R2, R3 and R4 values may be used depending of type of transistor Q1.

Referring to FIG. 5, when the 5-volt control signal and the 14-volt battery input are activated, then the Ic, Ib, Vce and Vbe are produced at the transistor Q1. When the transistor Q1 is within a 1-20 millimeters vicinity or distance of the power bridge 305, the transistor Q1 senses the heat emitted from the power bridge 305. Pre-charge circuit 309 generates a voltage or Vbe, as stated above, at transistor Q1 in response to receiving the control signal from the microprocessor 307 transmitted through the resistors R1 and R2 and the energy emitted from the power bridge 305. This voltage Vbe varies linearly as an inverse function of temperature or ambient temperature. For example, the following equation $V=(-0.00195*T)+0.6908$ is indicative of the function of Vbe versus an ambient temperature of the power bridge 305.

This generated voltage or Vbe at the base of the transistor Q1 is transmitted to an input of the operational amplifier system 311 of FIG. 3 for sensing temperature. This operational amplifier system 311 includes an operational amplifier 501 connected to the resistor R5, capacitor C1 and resistor R6 shown in FIG. 5. These components have the following values R5 is 1 kohms, C1 is 10 nanofarads and R6 is 4.99 kohms in one example, but other values may be used. The resistors R5 and R6 connected to the operational amplifier 501 provide a gain for Vbe (generated voltage) at transistor Q1. In alternative embodiments, a fractional gain is used. After the gain is provided to the generated voltage, then the operational amplifier system 311 transmits the gain adjusted voltage to a filter. This filter includes resistor R7 and capacitor C2 connected to the operational amplifier 501 and resistor R6 that forms a signal conditioner. The gain and the filter makes the output signal of the gain adjusted voltage within a range suitable for an analog to digital conversion according to the equation $Vout=(-0.0117*t)+4.1379$. The value of resistor R7 is 27 kohms and the value of capacitor C2 is 10 nanofarads, but other values may be used.

After the gain adjusted voltage is filtered for analog-to-digital conversion, then this voltage is inputted to an analog to digital input of microprocessor 307 of FIG. 3 or an analog-to-digital converter connected to the microprocessor 307. Microprocessor 307 converts this gain adjusted, filtered voltage to a digital value Vd. Microprocessor 307 uses this resulting digital value to calculate temperature by equation: $T=(4.1379-Vd)/0.0017$. Microprocessor 307 also compares the temperature with predetermined thresholds or otherwise converted the temperature value or control instructions based on the measured temperature. For example, if Vbe is 0.6 volts, then the ambient temperature in the vicinity of or at the transistor Q1 is 50 degrees Celsius. Based on the value of Vbe, the microprocessor 307 may set a trouble code or take action to adjust the power being dissipated in the vicinity of the transistor Q1. Microprocessor 307 adjusts the power being dissipated in the vicinity of the transistor Q1 by reducing or turning off the operating voltages and/or current transmitted from the microprocessor 307 to the power bridge 305. For example, microprocessor 307 may transmit a pulse width modulated signal to the power bridge driver 303 instead of a steady on signal. This pulse width modulated signal reduces the voltages and/or currents transmitted from the power bridge driver 303 and power bridge 305 to the motor 301, reducing or decreasing internal heat generated by the power bridge 305 driving this motor 301. The power bridge driver 303 receives the pulse width modulated signal, then this power bridge driver 303 transmits reduced operating supply voltages and/or currents to the power bridge 305. Power bridge 305 reduces the voltages and/or currents supplied to the motor 301. In alternative embodiments, the modulation width of a pulse width modulation signal is adjusted as a function of temperature. Other signals with or without modulation may be adjusted as a function of temperature.

In the example above, the transistor Q1 is part of a pre-charge circuit 309 of an EPAS. In other embodiments, other transistors or diodes of any component of the EPAS may be used in addition or alternative to the transistor Q1. In yet other embodiments, a transistor or diode of a non-EPAS circuit used in a vehicle or not in a vehicle is used for the designed function and also the temperature sensing described herein. For example, a transistor that is part of a control module for any device is used for operation of the control module as well as sensing temperature.

From the foregoing, it can be seen that the present invention provides a system for measuring a temperature of an electrical device. The transistor is in any electrical device. The transistor is operable to perform a first function for the electrical device. The microprocessor is responsive to a voltage at the transistor to determine a temperature of the electrical device, the function of sensing the temperature of the electrical device is different than the first function of the same transistor. In many, but not necessarily all embodiments, the transistor used for one function in an electrical device is operated in a saturated state. Based on the saturated transistor, this system is able to simply and accurately generate a signal representing temperature of the electrical device.

It is therefore intended that the foregoing detailed description be regarded as illustrative rather than limiting, and that it be understood that it is the following claims, including all equivalents, that are intended to define the spirit and scope of this invention.

We claim:

1. A system for measuring a temperature of an electrical device in an electrical power assistance steering system, the system comprising:
   a transistor located in the electrical device and operative in a saturated state to perform a first function during normal operation of the electrical device, the first function comprising driving a MOSFET to supply current to large capacity capacitors in a pre-charge circuit of the electrical power assistance steering system;
   a microprocessor responsive to a voltage of the transistor, wherein the voltage is operable to vary as a function of temperature of the electrical device, the transistor performing the first function concurrently with a second function of sensing the temperature of the electrical device during normal operation while the transistor is in the saturated state.

2. The system of claim 1, wherein the microprocessor comprises an electronic erasable program read only memory.

3. The system of claim 1, wherein the transistor comprises a NPN transistor.

4. The system of claim 1, wherein the transistor is in the proximity of a power bridge.

5. The system of claim 1, wherein the transistor is a component of a pre-charge circuit of an electrical power assisted steering device, the transistor responsive to the microprocessor for activating the pre-charge circuit;
   further comprising;
   an operational amplifier connected with the transistor and the microprocessor, the transistor being connected with an input of the operational amplifier and the output of the operational amplifier connected with an input of the microprocessor.

6. The system of claim 1, wherein the transistor is positioned adjacent to a heat producing component of the electrical device.

7. The system of claim 1, wherein the transistor is responsive to the microprocessor for performing the first function.

8. The system of claim 1, wherein the microprocessor is operable to alter a control signal as a function of the voltage.

9. The system according to claim 1, wherein the first function of the transistor includes switching the state of a power bridge during normal operation.

10. The system of claim 1, wherein the microprocessor is operable to supply a voltage to the electrical device.

11. The system of claim 10 wherein the microprocessor is operable to control adjustment of a current supplied to the electrical device based on the temperature of the electrical device.

12. The system of claim 10 wherein the microprocessor is operative to control a reduction of the current supplied to the electrical device based on the temperature of the electrical device.

13. The system of claim 10 wherein the microprocessor is operable to turn-off a current supplied to the electrical device based on the temperature of the electrical device.

14. A method for measuring a temperature of an electrical device, the method comprising:
   switching the state of a power bridge with a transistor of an electrical device during normal operation of the transistor;
   determining a temperature of the electrical device as a function of voltage of the transistor during normal operation of the transistor; and
   wherein the switching the state of the power bridge and the determining the temperature as a function of the voltage of the transistor occurs concurrently while the transistor is in the saturated state.

* * * * *